United States Patent Office 3,244,722
Patented Apr. 5, 1966

3,244,722
**CERTAIN ETHERS OF (TRICHLOROMETHYL)
PYRIDINE COMPOUNDS**
Howard Johnston, Concord, and Mary S. Tomita, Walnut Creek, Calif., assignors to The Dow Chemical Company, Midland, Mich., a corporation of Delaware
No Drawing. Filed Jan. 28, 1964, Ser. No. 340,791
11 Claims. (Cl. 260—294.8)

The present invention is concerned with (trichloromethyl)pyridine ether compounds having the formula

In this and succeeding formulas, Z is OR or SR' wherein in said OR, R is alkyl, aryl, lower alkenyl, wherein in said SR', R' is alkyl or aryl, and wherein $x$ is an integer of from 1 to 3, inclusive.

The products of the present invention are white crystalline solids or oily liquids, soluble in many organic solvents such as carbon tetrachloride, perchloroethylene, chloroform, diethyl ether, pentane, hexane, ethyl alcohol and isopropyl alcohol and substantially insoluble in water.

The (trichloromethyl)pyridine ethers of the present invention are useful in various agricultural applications. They are useful as parasiticides and are adapted to be employed as toxic constituents of coccidiostat, anthelmintic, insecticide and miticide compositions. They are also useful in agronomical practice for the control of weeds and weed seeds. Many of the compounds are excellent nitrification inhibitors.

The compounds of the present invention may be prepared by intimately contacting and causing to react a chloro-(trichloromethyl)pyridine compound having the formula

with the sodium salt of a hydroxy or thiol compound having the formula, ZNa, whereupon the desired (trichloromethyl)pyridine ether compound product and sodium chloride by-product are formed.

By the expression "hydroxy compound" as herein employed is meant an appropriate alcohol or phenol supplying OR to Z in Formula I. When R in OR is alkyl or lower alkenyl, the contributing hydroxy compound is an alkanol or a lower alkenol, respectively. Suitable alkanols include methyl alcohol, ethyl alcohol, secondary-butyl alcohol, normal-amyl alcohol, 3,7-dimethyloctanol-1, secondary-hexyl alcohol, nonyl alcohol, normal-undecyl alcohol, 3 - pentadecanol, tridecyl alcohol, normal-pentadecyl alcohol, normal-heptadecyl alcohol, 2,3-dimethylpentanol-3, secondary-amyl alcohol, 5-methylhexanol-1, methylnonyl carbinol, 2-ethylhexanol, 5-ethyl - 2 - nonanol and cetyl methylcarbinol. Suitable lower alkenols include allyl alcohol, crotyl alcohol and 2-methylallyl alcohol.

When R in OR is aryl, the contributing hydroxy compound is a phenol. Suitable phenols include monocyclic phenols containing from 1 to 5 substituents on a phenyl ring selected from the group consisting of hydrogen, alkyl containing from 1 to 10 carbon atoms, inclusive, phenyl, chloro and nitro. Typical phenols include phenol, o-ethylphenol, m-ethyl phenol, 4-methyl-5-ethylphenol, 2 - methyl - 4 - ethylphenol, p - cresol, 3,5 - dimethylphenol, 2,5-dimethylphenol, 2,4-diethylphenol, 3,5-diethylphenol, thymol, carvacrol, p - tertiary - butylphenol, m-secondary-butylphenol, p-secondary-amylphenol, p-normal-hexyphenol, p-tertiary-octylphenol, 2,5-dimethyl-6-ethylphenol, p-decylphenol, pentachlorophenol, 2,4-dichlorophenol, p-chlorophenol, p-phenylphenol, 2-chloro-4 - phenylphenol, 2,3,4 - trichlorophenol, 2,3,5,6 - tetrachlorophenol, 2,3,5,6 - tetrachloro - o - cresol, 4 - chloro-2-phenylphenol, p-nitrophenol, 2-nitro-p-cresol, 2-chloro-4 - nitrophenol, 6 - chlorothymol, p - chloro - m - xylenol, p-isopropylphenol, nitrotertiary-butyl-o-cresol, 2-secondary-butyl-4,6-dinitrophenol, 4,6-dichloro-o-cresol, 2-isopropyl-4,6-dinitrophenol, 2-hexyl-4,6-dinitrophenol, 2,4-dinitro-6-phenylphenol, 2,4-dichloro-symmetrical-3,5-xylen-1-ol, 2,5-diisopropylphenol, 3,5-dinitrophenol, 2,3,5,6-tetramethylphenol, 2,4,6-trichloro-m-cresol and 2,3,5-trimethylphenol.

By the expression "thiol compound" as herein employed is meant an appropriate mercaptan or thiophenol supplying SR' to Z in Formula I. Suitable mercaptans are those containing from 1 to 18 carbon atoms inclusive, and include octadecyl mercaptan, cetyl mercaptan, lauryl mercaptan, normal-tetradecyl mercaptan, normal-hexyl mercaptan, ethyl mercaptan, normal heptyl mercaptan, methyl mercaptan and butyl mercaptan.

Suitable thiophenols include monocyclic thiophenols containing from 1 to 5 substituents on a phenyl ring selected from the group consisting of hydrogen, alkyl containing from 1 to 4 carbon atoms, inclusive, phenyl, chloro and nitro. Typical thiophenols include benzenethiol, p - tertiary - butylbenzenethiol, 2,6 - diethylbenzenethiol, 2,4,6 - triisopropylbenzenethiol, 2,4,6 - trinitrobenzenethiol, 2,4,6-trimethylbenzenethiol, 4-biphenylthiol, 2,4,5-trichlorobenzenethiol, pentachlorobenzenethiol, 4-nitrobenzenethiol, 2-chlorobenzenethiol, 2,4-dichlorobenzenethiol, m-toluenethiol, 3,4-dichlorobenzenethiol, 2,5-dichlorobenzenethiol, 2,4-dinitrobenzenethiol and o-ethylbenzenethiol.

In carrying out the reaction, the appropriate chloro-(trichloromethyl)pyridine compound is added to a solution of the sodium salt of the appropriate hydroxy or thiol compound in a solvent at temperatures of from about 60° to about 120° C. for from about 0.5 to 10 hours. Suitable solvents or diluents for carrying out the reaction include alcohol or mercaptan corresponding to the ether prepared, lower alcohols such as ethanol or isopropanol, tetrahydrofuran, etc. The reaction is conveniently carried out at the reflux temperature of the reaction mixture. As a result of these operations, a reaction takes place with the formation of the desired (trichloromethyl)pyridine ether compound and sodium chloride by-product. The reaction mixture may be filtered to remove the sodium chloride and the filtrate washed with water and/or stripped of solvent to recover the desired (trichloromethyl)pyridine ether compound as residue; or the reaction mixture may be heated to distill off most of the solvent and the residue diluted with water to dissolve the sodium chloride by-product and to precipitate the desired product which may be extracted with water immiscible solvent, the solvent distilled off and the product recovered as residue, or a modification of such procedures. The product may be purified by recrystallizing from solvents such as hexane, pentane or mixtures thereof.

In a preferred method for carrying out the reaction, the appropriate chloro-(trichloromethyl)pyridine compound is added to the sodium salt of an appropriate hydroxy or thiol compound in a suitable solvent and the resulting mixture heated at the reflux temperature of the mixture for from about 2 to 15 hours whereupon the (trichloromethyl)pyridine ether product and sodium chloride by-product are formed, the latter precipitating in the reaction mixture. The mixture is filtered to remove the sodium chloride and the filtrate diluted with water, extracted with a hydrocarbon solvent such as hexane or pentane, the extract stripped of the solvent under reduced pressure and the product recovered as residue. The product may be further purified by conventional procedures.

The following examples illustrate the invention but are not to be construed as limiting:

*Example 1.—3,5-dichloro-4-methoxy-2-(trichloromethyl) pyridine*

A solution of 5.4 grams (0.1 mole) of sodium methoxide in 100 milliliters of methanol was added dropwise with stirring over a 45 minute period to a solution of 30.0 grams (0.1 mole) of 3,4,5-trichloro-2-(trichloromethyl)pyridine in 100 milliliters of methanol while the reaction mixture was heated at the reflux temperature of the mixture. After completion of the addition, the reaction mixture was heated at the reflux temperature with stirring for an additional two hours to obtain a 3,5-dichloro-4-methoxy-2-(trichloromethyl)pyridine product and a sodium chloride by-product which precipitated in the reaction mixture. The by-product was removed by filtration and the filtrate subjected to the reduced pressure of an aspirator to remove the solvent and to recover the product as residue. The product was recrystallized from hexane; it had a melting point of 43°–45° C. and elemental analyses (percent) as follows:

|  | Carbon | Hydrogen | Nitrogen | Chlorine |
|---|---|---|---|---|
| Theory | 28.4 | 1.37 | 4.73 | 60.0 |
| Found | 28.8 | 1.59 | 4.65 | 59.6 |

*Example 2.—2,3,5-trichloro-4-methoxy-6-(trichloromethyl)pyridine*

16.7 grams (0.05 mole) of 2,3,4,5-tetrachloro-6-(trichloromethyl)pyridine was added to a solution of sodium methoxide in methanol prepared by dissolving and reacting 1.15 grams (0.05 gram atom) of sodium in 100 grams of methanol. The resulting mixture was heated at the reflux temperature of the mixture for about 5.5 hours whereupon a reaction took place with the formation of a 2,3,5-trichloro-4-methoxy-6-(trichloromethyl)pyridine product and sodium chloride by-product. The mixture was distilled to remove most of the methanol and the residual mixture poured into water to precipitate the desired product. The aqueous mixture was extracted with hexane to recover the product and the hexane extract concentrated, and the concentrated solution allowed to cool to precipitate the product. The product had a melting point of 68°–69° C. and elemental analyses in percent as follows:

|  | Carbon | Hydrogen | Nitrogen | Chlorine |
|---|---|---|---|---|
| Theory | 25.6 | 0.91 | 64.5 | 4.24 |
| Found | 25.52 | 0.86 | 64.22 | 4.32 |

*Example 3.—2,3,5 - trichloro - 4 - isopropoxy - 6 - (trichloromethyl)pyridine and 3,4,5-trichloro-2-isopropoxy-6-(trichloromethyl)pyridine*

16.7 grams (0.05 mole) of 2,3,4,5-tetrachloro-6-(trichloromethyl)pyridine was added with stirring to a hot solution of sodium isopropoxide in isopropanol which had been prepared by adding 1.15 grams (0.05 gram atom) of sodium into 100 grams of hot isopropanol. The resulting mixture was heated at the reflux temperature of the reaction mixture for three hours. At the end of this period, the mixture was distilled to remove the isopropanol and the residue added to water to precipitate an oil. The aqueous mixture was extracted with hexane and ether, the combined extracts dried, and the dried extract distilled to remove the solvents and to recover a 2,3,5 - trichloro - 2 - isopropoxy - 6 - (trichloromethyl) pyridine and 3,4,5-trichloro-2-isopropoxy-6-(trichloromethyl)pyridine product mixture as an orange-brown oil in a yield of 83.5 percent. The product boiled at 114° C. at 1 millimeter of mercury pressure. The product had elemental analyses as follows:

|  | Carbon | Hydrogen | Chlorine | Nitrogen |
|---|---|---|---|---|
| Theory | 30.3 | 1.96 | 59.5 | 3.92 |
| Found | 30.18 | 2.11 | 59.56 | 4.01 |

Vapor chromatographic analysis showed the composition of the oil product to have the following composition: 72.8 mole percent 2,3,5-trichloro-4-isopropoxy-6-(trichloromethyl)pyridine, 20.7 mole percent 3,4,5-trichloro-2-isopropoxy-6-(trichloromethyl)pyridine and 6.5 mole percent unreacted 2,3,4,5-tetrachloro-6-(trichloromethyl) pyridine. The identity of the two isomers was established by infra-red spectral analysis.

*Example 4.—2,3,5-trichloro-4-ethoxy-6-(trichloromethyl) pyridine and 3,4,5 - trichloro - 2 - ethoxy - 6 - (trichloromethyl)pyridine*

In a similar manner, 16.7 grams (0.05 mole) of 2,3,4,5-tetrachloro-6-(trichloromethyl)pyridine was added to a solution of 3.4 grams of sodium ethoxide in ethanol, and the resulting mixture heated at the reflux temperature of the mixture for 5.5 hours to obtain a product mixture containing about 76 mole percent of 2,3,5-trichloro-4-6-(trichloromethyl)pyridine having a molecular weight of 344 and about 20 mole percent of 3,4,5-trichloro-2-ethoxy-6-(trichloromethyl)pyridine having a molecular weight of 344 as a yellow colored oil.

*Example 5.—2-chloro-4-methoxy-6-(trichloromethyl)pyridine*

In a similar manner, 26.5 grams (0.1 mole) of 2,4-dichloro-6-(trichloromethyl)pyridine of 93 percent purity was added to a solution of sodium methoxide in methanol prepared from 2.3 grams (0.1 gram atom) of sodium and 500 milliliters of methanol, and the resulting mixture heated at the reflux temperature of the mixture for about 2.5 hours whereupon the desired 2-chloro-4-methoxy-6-trichloromethyl)pyridine product and sodium chloride byproduct formed in the reaction mixture. The mixture was then distilled to remove the alcohol and the residue washed with water to precipitate the product in the aqueous mixture as an oil. The oil was recovered and dried with sodium sulfate whereupon the oil crystallized into a solid product. The product was recovered from the product-sodium sulfate mixture by melting the mixture and filtering off the sodium sulfate. The product has a molecular weight of 261 and had the following elemental analyses:

|  | Carbon | Hydrogen | Nitrogen | Chlorine |
|---|---|---|---|---|
| Theory | 32.3 | 1.92 | 5.38 | 54.4 |
| Found | 32.31 | 1.93 | 5.43 | 54.22 |

*Example 6.—2-chloro-6-methoxy-4-(trichloromethyl)pyridine*

In a manner similar to that previously described, 15 grams (0.06 mole) of 2,6-dichloro-4-(trichloromethyl) pyridine, 1.4 grams (0.06 gram atom) of sodium and 150 milliliters of methanol were mixed together and the resulting mixture heated at the reflux temperature of the reaction mixture for 5.25 hours whereupon a reaction took place with the formation of the desired 2-chloro-6-methoxy-4-(trichloromethyl)pyridine product and sodium chloride by-product. At the end of the heating period, the mixture was distilled to remove subtsantially all of the solvent and the residue diluted with methlyene dichloride and thereafter filtered to remove the sodium chloride by-product. The filtrate thus obtained was distilled to remove the solvent and recover as residue, the product as an amber liquid in a yield of 13 grams or 88.5 percent of theory. The product has a molecular weight of 261 and had elemental analyses as follows:

|  | Carbon | Hydrogen | Chlorine | Nitrogen |
| --- | --- | --- | --- | --- |
| Theory | 32.2 | 1.92 | 54.2 | 5.38 |
| Found | 32.26 | 1.93 | 54.22 | 5.15 |

*Example 7.—5-chloro-2-methoxy-4-(trichloromethyl)pyridine*

In a similar manner, 5-chloro-2-methoxy-4-(trichloromethyl)pyridine product was obtained as a white solid by the reaction of 13.3 grams (0.05 mole) of 2,5-dichloro-4-(trichloromethyl)pyridine, 1.2 grams (0.05 gram atom) of sodium and 200 milliliters of methanol. The product has a molecular weight of 261 and had elemental analyses as follows:

|  | Carbon | Hydrogen | Chlorine | Nitrogen |
| --- | --- | --- | --- | --- |
| Theory | 32.2 | 1.92 | 54.2 | 5.35 |
| Found | 32.35 | 2.03 | 54.53 | 5.56 |

*Example 8.—3-chloro-2-methoxy-6-(trichloromethyl)pyridine*

In a similar manner, 3-chloro-2-methoxy-6-(trichloromethyl)pyridine product was obtained as a light yellow liquid in a yield of 94.5 percent by the reaction of 10 grams (0.038 mole) of 2,3-dichloro-6-(trichloromethyl)pyridine, 0.87 gram (0.038 gram atom) of sodium and 80 milliliters of methanol. The product has a molecular weight of 261 and had a carbon content of 32.35 percent and a hydrogen content of 2.19 percent. The theoretical values for carbon and hydrogen are 32.2 percent and 1.92 percent, respectively.

*Example 9*

In a manner similar to that previously described, the following compounds are prepared:

3,5-dichloro-4-ethoxy-2-(trichloromethyl)pyridine having a melting point of 51°–53° C. by the reaction of 3,4,5-trichloro-2-(trichloromethyl)pyridine and sodium ethoxide in ethanol.

3,5 - dichloro - 4 - isopropoxy - 2 - (trichloromethyl) pyridine having a melting point of 69°–71° C. by the reaction of 3,4,5-trichloro-2-(trichloromethyl)pyridine and sodium isopropoxide in isopropanol.

3,5 - dichloro - 4 - (n - decyloxy) - 2 - trichloromethyl) pyridine as an oil having a molecular weight of 421 by the reaction of 3,4,4-trichloro-2-(trichloromethyl)pyridine and sodium n-decyloxide in 1-decanol.

5 - chloro - 4 - (n - dodecyloxy) - 2 - (trichloromethyl) pyridine having a molecular weight of 386 by the reaction of 4,5-dichloro-2-(trichloromethyl)pyridine and sodium n-dodecyloxide in 1-dodecanol.

3,5 - dichloro - 4 - (n - octadecyloxy) - 2 - (trichloromethyl)pyridine having a molecular weight of 534 by the reaction of 3,4,5-trichloro-2-(trichloromethyl)pyridine and sodium n-octadecycloxide in 1-octadecanol.

2,3,5 - trichloro - 4 - (n - butoxy) - 6 - (trichloromethyl) pyridine and 3,4,5-trichloro-2-(n-butoxy)-6-(trichloromethyl)pyridine as an oil containing 79.6 mole percent 2,3,5 - trichloro - 4 - (n - butoxy) - 6 - (trichloromethyl) pyridine and 18.1 mole percent 3,4,5-trichloro-2-(n-butoxy)-6-(trichloromethyl)pyridine by the reaction of 2,3,4,5-tetrachloro-6-(trichloromethyl)pyridine and sodium n-butoxide in 1-butanol.

3,5 - dichloro - 4 - (n - butoxy) - 2 - (trichloromethyl) pyridine as an oil having a molecular weight of 337 by the reaction of 3,4,5-trichloro-2-(trichloromethyl)pyridine and sodium n-butoxide in 1-butanol.

3,5 - dichloro - 4 - (n - hexyloxy) - 2 - (trichloromethyl)pyridine as an oil having a molecular weight of 365.5 by the reaction of 3,4,5-trichloro-2-(trichloromethyl)pyridine and sodium n-hexyloxide in 1-hexanol.

2,3,5 - trichloro - 4 - (n - heptyloxy) - 6 - (trichloromethyl)pyridine and 3,4,5 - trichloro - 2 - (n - heptyloxy) 6-(trichloromethyl)pyridine having a molecular weight of 414 by the reaction of 2,3,4,5-tetrachloro-6-(trichloromethyl)pyridine and sodium n-heptyloxide in 1-heptanol.

2,3,5 - trichloro - 4 - (n - octadecyloxy) - 6 - (trichloromethyl)pyridine and 3,4,5-trichloro-2-(n-octadecyloxy)-6-(trichloromethyl)pyridine having a molecular weight of 568 by the reaction of 2,3,4,5-tetrachloro-6-(trichloromethyl)pyridine and sodium n-octadecyloxide in 1-octadecanol.

2 - chloro - 6 - (n - tetradecyloxy) - 4 - (trichloromethyl)pyridine having a molecular weight of 443 by the reaction of 2,6-dichloro-4-(trichloromethyl)pyridine and sodium n-tetradecyloxide in 1-tetradecanol.

5 - chloro - 2 - (n - hexadecyloxy) - 4 - (trichloromethyl)pyridine having a molecular weight of 471 by the reaction of 2,5-dichloro-4-(trichloromethyl)pyridine and sodium n-hexadecyloxide in 1-hexadecanol.

3 - chloro - 2 - isoamyloxy - 6 - (trichloromethyl)pyridine having a molecular weight of 317 by the reaction of 2,3-dichloro-6-(trichloromethyl)pyridine and sodium 3-methylbutoxide in isoamyl alcohol.

2,3 - dichloro - 4 - ethoxy-5-(trichloromethyl)pyridine having a molecular weight of 310 by the reaction of 2,3,4 - trichloro-5-(trichloromethyl)pyridine and sodium ethoxide in ethanol.

*Example 10.—3,5 - dichloro - 4 - (p - chlorophenoxy)-2-(trichloromethyl)pyridine*

9 grams (0.07 mole) of p-chlorophenol was added to a solution of sodium ethoxide in ethanol prepared by adding in small portions, 1.5 grams (0.065 gram atom) of sodium to 200 milliliters of dry ethanol. The resulting mixture was heated to about 45° C. and to it was added 15.0 grams (0.05 mole) of 3,4,5-trichloro-2-(trichloromethyl)pyridine. The mixture was heated at about 79° C. under reflux for about 4.25 hours whereupon a reaction took place with the formation of a 3,5-dichloro-4-(p-chlorophenoxy)-2 - (trichloromethyl)pyridine product and a sodium chloride by-product which precipitated in the reaction mixture. The sodium chloride was removed by filtration and the filtrate concentrated by stripping off about one-half of the ethanol solvent. The residual solution was diluted with water, made strongly basic with a sodium hydroxide solution and the resulting solution extracted with diethyl ether. The ether extract was dried, most of the solvent removed by distillation, and the residual liquid cooled whereupon there was obtained 17.7 grams or 90 percent of theoretical of a 3,5-dichloro-4-(p-chlorophenoxy)-2-(trichloromethyl)pyridine product as a crystalline solid. The solid after recrystallization from ethanol melted from 97° to 103° C. and had elemental analyses as follows:

|  | Carbon | Hydrogen | Nitrogen | Chlorine |
| --- | --- | --- | --- | --- |
| Theory | 36.9 | 1.28 | 3.58 | 54.2 |
| Found | 36.31 | 1.40 | 3.54 | 54.2 |

*Example 11.—3,5 - dichloro - 4 - nonylphenoxy - 2 - (trichloromethyl)pyridine*

In a similar manner, 26 grams (0.05 mole) of nonylphenol is added to a solution of sodium ethoxide in ethanol prepared by adding 1.1 grams (0.05 gram atom) of sodium into 200 milliliters of dry ethanol. The resulting mixture is warmed and to it is added 15 grams (0.05 mole) of 3,4,5 - trichloro - 2-(trichloromethyl)pyridine. The resulting mixture is heated at the reflux temperature of the reaction mixture to obtain a 3,5-dichloro-4-nonylphenoxy-2-(trichloromethyl)pyridine product and sodium chloride by-product. The sodium chloride is removed by filtration, the filtrate distilled to remove the solvent and to recover as residue the desired product having a molecular weight of 582.

*Example 12*

In a similar manner, the following compounds are prepared in ethanol solvent:

2,3,5 - trichloro - 4 - phenoxy-6-(trichloromethyl)pyridine having a molecular weight of 392 by the reaction of sodium phenoxide and 2,3,4,5 - tetrachloro - 6-(trichloromethyl)pyridine.

5 - chloro - 4 - (p - nitrophenoxy) - 2-(trichloromethyl)pyridine having a molecular weight of 368 by the reaction of sodium p-nitrophenoxide and 4,5-dichloro-2-(trichloromethyl)pyridine.

5 - chloro - 2 - (pentachlorophenoxy) - 4 - (trichloromethyl)pyridine having a molecular weight of 495 by the reaction of sodium pentachlorophenoxide and 2,5 - dichloro-4-(trichloromethyl)pyridine.

3 - chloro - 5 - (trichloromethyl) - 2 - (2,4-xylyloxy)-pyridine having a molecular weight of 324 by the reaction of sodium xylyloxide and 2,3-dichloro-5-(trichloromethyl)pyridine.

5 - chloro - 2 - (2,4 - dinitrophenoxy)-4-(trichloromethyl)pyridine by the reaction of sodium 2,4-dinitrophenoxide and 2,5-dichloro-4-(trichloromethyl)pyridine.

4 - chloro - 2 - (2 - chloro - 4 - phenylphenoxy)-6-(trichloromethyl)pyridine by the reaction of sodium 2-chloro-4-phenylphenoxide and 2,4 - dichloro - 6-(trichloromethyl)pyridine.

3,5 - dichloro - 4 - (o - phenylphenoxy) - 2 - (trichloromethyl)pyridine having a molecular weight of 433 by the reaction of 3,4,5 - trichloro - 2-(trichloromethyl)pyridine and sodium o-phenylphenoxide.

3,5 - dichloro - 4 - (2,4,6 - trichlorophenoxy) - 2 - (trichloromethyl)pyridine having a molecular weight of 460 by the reaction of 3,4,5-trichloro-2-(trichloromethyl)pyridine and sodium 2,4,6-trichlorophenoxide.

3,5 - dichloro - 4 - (2 - methyl - 4,6-dinitrophenoxy)-2-(trichloromethyl)pyridine having a molecular weight of 460 by the reaction of 3,4,5 - trichloro-2-(trichloromethyl)pyridine and sodium 2-methyl-4,6-dinitrophenoxide.

*Example 13.—4 - allyloxy - 2,3,5 - trichloro-6-(trichloromethyl)pyridine*

In a similar manner, a solution of 8 grams (0.1 mole) of sodium allyloxide in allyl alcohol is prepared by the addition of 2.3 grams of sodium to 150 milliliters of allyl alcohol. To the resulting mixture is added 33.4 grams (0.1 mole) of 2,3,4,5-tetrachloro-6-(trichloromethyl)pyridine and the mixture heated at reflux temperature for several hours to obtain a 4 - allyloxy - 2,3,5 - trichloro-6-(trichloromethyl)pyridine product and sodium chloride by-product. The sodium chloride is removed by filtration, the filtrate distilled to remove the solvent and to recover as residue the desired 4 - allyloxy - 2,3,5 - trichloro-6-(trichloromethyl)pyridine product having a molecular weight of 356.

*Example 14*

In a similar manner, the following compounds are prepared:

3,5 - dichloro - 4 - crotyloxy - 2 - (trichloromethyl)pyridine having a molecular weight of 326 by the reaction of 3,4,5 - trichloro-2-(trichloromethyl)pyridine and sodium crotyloxide.

4 - allyloxy - 5 - chloro - 2 - (trichloromethyl)pyridine having a molecular weight of 287 by the reaction of 4,5-dichloro - 2 - (trichloromethyl)pyridine and sodium allyloxide.

*Example 15.—3,5 - dichloro - 4 - (methylthio) - 2 - (trichloromethyl)pyridine*

4.3 grams (0.09 mole) of methyl mercaptan was added to a cooled solution of sodium ethoxide prepared by adding 1.5 grams (0.065 gram atom) of sodium into 160 milliliters of methanol to obtain sodium methyl mercaptide. 18 grams (0.06 mole) of 3,4,5-trichloro-2-(trichloromethyl)pyridine was added to the resulting mixture containing sodium methyl mercaptide and the mixture heated at the reflux temperature of the reaction mixture for about 2 hours to obtain a 3,5-dichloro-4-(methylthio)-2-(trichloromethyl)pyridine product and sodium chloride by-product, the latter precipitating in the reaction mixture. About 200 milliliters of water was added to the reaction mixture to dissolve the sodium chloride and the resulting aqueous mixture was cooled whereupon the desired 3,5-dichloro-4-(methylthio)-2-(trichloromethyl)pyridine precipitated out as a solid. The latter was recovered by filtration and recrystallized from ethanol to obtain a purified product having a melting point of 79°–81° C. The yield of the product was 15.7 grams or 84.5 percent of theoretical.

*Example 16.—3,5-dichloro-4-(methylthio)-2-(trichloromethyl)pyridine*

In a similar manner, 3,5-dichloro-4-(methylthio)-2-trichloromethyl)pyridine was prepared by adding 15.0 grams of hexachloro-2-picoline into an alcoholic solution of sodium methyl mercaptide prepared by adding about 6 milliliters of methyl mercaptan to sodium ethoxide in ethanol prepared from 1.15 grams of sodium and 75 milliliters of ethanol and heating the resulting mixture at 60° C. for about three hours. The sodium chloride by-product which also formed was removed by filtration, the solvent distilled off and the product recovered as residue. The 3,5 - dichloro - 4-(methylthio)-2-(trichloromethyl)pyridine product melting at 74°–76° C. had elemental analyses as follows:

|  | Chlorine | Sulfur |
|---|---|---|
| Theory | 57.0 | 10.3 |
| Found | 56.84 | 10.10 |

*Example 17.—3,5-dichloro-4-(ethylthio)-2-(trichloromethyl)pyridine*

6.2 grams (0.1 mole) of ethyl mercaptan was added to a solution of sodium ethoxide prepared by adding 2.3 grams (0.14 gram atom) of sodium into 200 milliliters of ethanol to obtain sodium ethyl mercaptide. 30 grams (0.1 mole) of 3,4,5-trichloro-2-(trichloromethyl)pyridine was added to the resulting mixture containing sodium ethyl mercaptide and the mixture heated at the reflux temperature of the reaction mixture to obtain a 3,5-dichloro-4-(ethylthio)-2-(trichloromethyl)pyridine product and sodium chloride by-product, the latter precipitating in the reaction mixture. The reaction mixture was filtered to remove the sodium chloride. Water was added to the filtrate and the resulting mixture extracted with hexane; the hexane extract was distilled to remove the hexane and to recover as residue the desired 3,5-dichloro-4-(ethylthio)-2-(trichloromethyl)pyridine product as an oily residue having a molecular weight of 325.5. The yield of the product was 98.5 percent. The elemental analyses of the product were as follows:

|  | Carbon | Hydrogen | Sulfur |
|---|---|---|---|
| Theory | 29.6 | 1.86 | 9.85 |
| Found | 29.46 | 1.91 | 9.74 |

*Example 18.—3,5-dichloro-4-(n-octylthio)-2-(trichloromethyl)pyridine*

In a similar manner, 7.3 grams (0.05 mole) of normal octyl mercaptan was added to a solution of sodium ethoxide prepared by adding 1.2 grams 0.05 gram atom) of sodium into 150 milliliters of ethanol. 15 grams (0.05 mole) of 3,4,5 - trichloro-2-(trichloromethyl)pyridine was added to the resulting mixture and the mixture was heated at the reflux temperature of the mixture for almost 5.5 hours to obtain a 3,5-dichloro-4-(n-octylthio)-2-(trichloromethyl)pyridine product and sodium chloride by-product. The reaction mixture was filtered to remove the sodium chloride and the filtrate distilled to remove the solvent. The residue was dissolved in hexane and refiltered to remove additional salt and the filtrate then distilled to remove the hexane solvent and to recover as residue the desired 3,5-dichloro-4-(n-octylthio)-2-(trichloromethyl)pyridine product as an amber liquid having a molecular weight of 409.6. The product which was obtained in a yield of 90.5 percent had a sulfur content of 7.68 percent; the theoretical value is 7.82 percent.

*Example 19*

In a manner similar to that described in Examples 15–18, the following compounds are prepared in ethanol, excess mercaptan or tetrahydrofuran solvent:

2,3,5 - trichloro - 4 - (methylthio) - 6 - (trichloromethyl)pyridine having a molecular weight of 346 by the reaction of 2,3,4,5 - tetrachloro-6-(trichloromethyl)pyridine and sodium methylmercaptide.

2,3,5 - trichloro - 4 - (n - octadecylthio) - 6 - (trichloromethyl)pyridine having a molecular weight of 584.5 by the reaction of 2,3,4,5,-tetrachloro-6-(trichloromethyl)-pyridine and sodium n-octadecylmercaptide.

2 - chloro - 6 - (n - hexadecylthio) - 4 - (trichloromethyl)pyridine having a molecular weight of 487 by the reaction of 2,6-dichloro-4-(trichloromethyl)pyridine and sodium n-hexadecylmercaptide.

5 - chloro - 2 - (n - dodecylthio) - 4 - (trichloromethyl)-pyridine having a molecular weight of 427 by the reaction of 2,5-dichloro-4-(trichloromethyl)pyridine and sodium n-dodecylmercaptide.

3 - chloro - 2 - (n - tetradecylthio) - 6 - (trichloromethyl)pyridine having a molecular weight of 459 by the reaction of 2,3-dichloro-6-(trichloromethyl)pyridine and sodium n-tetradecylmercaptide.

2,3 - dichloro - 4 - (n - hexylthio) - 5 - (trichloromethyl)pyridine having a molecular weight of 382 by the reaction of 2,3,4 - trichloro-5-(trichloromethyl)pyridine and sodium n-hexylthiomercaptide.

*Example 20.—3,5-dichloro-4-(p-chlorophenylthio)-2-(trichloromethyl)pyridine*

In a similar manner, 14.4 grams (0.1 mole) of p-chlorothiophenol is added to a solution of sodium ethoxide prepared by adding 2.3 grams (0.1 gram atom) of sodium into 250 milliliters of ethanol. 30 grams (0.1 mole) of 3,4,5 - trichloro - 2-(trichloromethyl)pyridine is added to the resulting mixture and the mixture heated at the reflux temperature of the reaction mixture to obtain a 3,5-dichloro - 4-(p-chlorophenylthio)-2-(trichloromethyl)pyridine product and sodium chloride by-product. The reaction mixture is filtered to remove the sodium chloride by-product and the filtrate washed with water and dilute alkali and the aqueous mixture extracted with diethyl ether. The ether extract is placed under reduced pressure to remove the solvent and to recover as residue the desired 3,5-dichloro-4-(p-chlorophenylthio)-2-(trichloromethyl)pyridine product having a molecular weight of 408.

*Example 21*

In a similar manner, the following compounds are prepared in ethanol solvent:

3,5 - dichloro - 4 - (p - nitrophenylthio) - 2 - (trichloromethyl)pyridine having a molecular weight of 450.5 by the reaction of 3,4,5 - trichloro-2-(trichloromethyl)pyridine and sodium salt of p-nitro thiophenol prepared from sodium ethoxide and ethanol.

2,3,5 - trichloro - 4 - (phenylthio) - 6 - (trichloromethyl)pyridine having a molecular weight of 408 by the reaction of 2,3,4,5-tetrachloro - 6 - (trichloromethyl)pyridine and a sodium salt of thiophenol.

2,3,5 - trichloro - 4 - (p - tolylthio) - 6 - (trichloromethyl)pyridine having a molecular weight of 422 by the reaction of 2,3,4,5 - tetrachloro - 6-(trichloromethyl)pyridine and a sodium salt of p-toluenethiol.

2 - chloro - 4 - (trichloromethyl) - 6 - (2,4,6 - trimethylphenylthio)pyridine having a molecular weight of 314 by the reaction of 2,6-dichloro-4-(trichloromethyl)pyridine and sodium salt of 2,4,6-trimethylbenzenethiol.

5 - chloro - 4 - (trichloromethyl) - 2 - (2,4,6 - trichlorophenylthio)pyridine having a molecular weight of 442 by the reaction of 2,5-dichloro-4-(trichloromethyl)pyridine and sodium salt of 2,4,6-trichlorobenzenethiol.

2,3,5 - trichloro - 4 - (p-phenylphenylthio) - 6 - (trichloromethyl)pyridine having a molecular weight of 484 by the reaction of 2,3,4,5-tetrachloro-6-(trichloromethyl) pyridine and the sodium salt of biphenylthiol.

3,5 - dichloro - 4 - (2,4 - dichloro - 6 - methylphenylthio)-2-(trichloromethyl)pyridine having a molecular weight of 438 by the reaction of 3,4,5-trichloro-2-(trichloromethyl)pyridine and sodium salt of 2,4-dichloro-6-methylbenzenethiol.

3,5 - dichloro - 4 - (pentachlorophenylthio) - 2 - (trichloromethyl)pyridine having a molecular weight of 529 by the reaction of 3,4,5-trichloro-2-(trichloromethyl)pyridine and the sodium salt pentachlorobenzenethiol.

The products of the present invention are useful as pesticides and are adapted to be employed in various agricultural operations. They are particularly useful as anthelmintics for the control of parasites infesting warm-blooded animals such as ascarids, tapeworms, pinworms, trichostrongylids, *Nematospiroides dubius,* etc. They are also useful as nitrification inhibitors. In addition, the (trichloromethyl)pyridine ethers are excellent herbicides, useful for the control of undesirable aquatic and terrestrial vegetation and seeds. Many of the compounds are useful for the control of pests such as mites, house flies, cockroaches, beetles, ticks and other insects. Certain of the compounds may be adapted to be employed as piscicides for the control of trash fish. Other compounds are useful as antimicrobial agents, particularly those infecting plants and causing "rust" and "blight" diseases but also include other applications of antimicrobial agents.

The usefulness of the compounds as anthelmintics may be seen from the following representative operations. In separate applications, 4-n-butoxy-3,5-dichloro-2-(trichloromethyl)pyridine, 4-(p - chlorophenoxy) 3,5-dichloro-2 - (trichloromethyl)pyridine, 2,3,5 - trichloro - 4 - methoxy-2-(trichloromethyl)pyridine, 2,3,5 - trichloro-4-isopropoxy-6-(trichloromethyl)pyridine and 2,3,5-trichloro-4-ethoxy-6-(trichloromethyl)pyridine were incorporated into feed to provide a concentration therein of one of the compounds of 600 parts by weight per million parts by weight of feed. Mice naturally infected with tapeworms were fed the foregoing medicated diet for about one week and thereafter sacrificed to determine the extent of control of tapeworms. It was found that there was complete control of the tapeworms in all cases.

The products of the present invention are also useful as nitrofication inhibitors. Typical nitrification inhibition results may be seen in the following representative applications. In separate operations, aqueous ammonium fertilizer compositions containing 500 parts by weight of nitrogen in the reduced form and 25 parts by weight of one of 4-(n-butylthio)-3,5-dichloro-2-(trichloromethyl) pyridine, 3,5-dichloro-4-methoxy-2-(trichloromethyl)pyridine, 2,3,5-trichloro-4-methoxy-6-(trichloromethyl)pyridine, 2,3,5 - trichloro - 4 - ethoxy - 6 - (trichloromethyl) pyridine, 2,3,5 - trichloro - 4 - ethoxy - 6 - (trichloromethyl)pyridine, 2,3,5 - trichloro - 4 - isopropoxy - 6 - (trichloromethyl)pyridine, 4-chloro-2-methoxy-6-(trichloromethyl)pyridine and 2-chloro-6-methoxy-4-(trichloromethyl)pyridine were prepared. The compositions so prepared were employed to treat seed beds of sandy loam soil having a pH of about 8 and having previously been leached to remove the nitrate and nitrite nitrogen. The compositions were applied as a drench in an amount sufficient to supply 100 parts by weight of reduced nitrogen and 5 parts by weight of the (trichloromethyl)pyridine ether compound. The soil was maintained at about 70° F. and after about 2 weeks, the extent of nitrification was determined by standard colorimetric analysis for combined nitrate and nitrite nitrogen with diphenylamine indicator. The results showed substantially complete inhibition of nitrification in all cases.

Representative of usefulness as plant pest control agents is seen in operations where the compounds of the present invention are employed for the control of plant-infesting two-spotted spider mites. In such operations, complete controls were obtained when the infested plants were dipped or sprayed in separate operations with an aqueous dispersion containing as toxic ingredient 500 parts by weight of one of 3,5-dichloro-4-methoxy-2-(trichloromethyl)pyridine and 3,5-dichloro-4-ethoxy-2-(trichloromethyl)pyridine in a million parts by weight of aqueous dispersion.

The usefulness of the compounds as herbicides may be seen in the following representative procedures. In separate operations, aqueous compositions containing one of 3,5 - dichloro - 4 - ethoxy - 2 - (trichloromethyl)pyridine and 3,5-dichloro-4-(ethylthio)-2-(trichloromethyl)pyridine at a concentration of 10 parts by weight per million parts by weight of composition were found to give complete kills of pig weed, cucumber, radish, German millet and crabgrass plants when applied to the foliage thereof.

Representative of the usefulness for the control of ticks is seen in the complete kills of the nymphs of lone star tick obtained when said nymphs were contacted in separate operations with compositions of 3,5-dichloro-4-methoxy-2-(trichloromethyl)pyridine and 3,5-dichloro-4-ethoxy-2-(trichloromethyl)pyridine as toxic ingredients at a concentration of 1 gram per 100 milliliters of solvent.

The compounds may be employed for the control of trash fish or other aquatic pests. It is found that excellent controls of daphnia are obtained when said species is contacted with an aqueous medium containing one part by weight per million of 4-n-butoxy-3,5-dichloro-2-(trichloromethyl)pyridine.

The preferred compounds of the present invention may be represented by a formula selected from the group consisting of

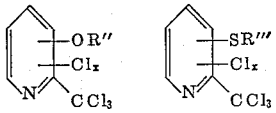

wherein R″ may be alkyl containing from 1 to 18 carbon atoms, lower alkenyl, phenyl, mono- and polychlorophenyl, and substituted phenyl containing from 1 to 3 substituents selected from the group consisting of alkyl, phenyl, chloro and nitro; and wherein R‴ may be alkyl containing from 1 to 18 carbon atoms, inclusive, phenyl and substituted phenyl containing at least one substituent selected from the group consisting of alkyl, phenyl, chloro and nitro; and x is an integer of from 1 to 3, inclusive.

The chloro-(trichloromethyl)pyridine compounds suitable for the preparation of the ether (trichloromethyl)pyridine compounds may be prepared by contacting an appropriate methylpyridine and hydrogen chloride at temperatures of about 50° C. to produce a liquid methylpyridine hydrochloride composition, thereafter passing chlorine gas through the liquid mixture at temperatures of from about 95° to about 110° C. while irradiating the reaction mixture and thereafter fractionally distilling the liquid mixture.

The starting chloro-(trichloromethyl)pyridine compounds suitable for the preparation of the ether (trichloromethyl)pyridine compounds may also be prepared by rapidly mixing in the vapor phase chlorine, an appropriate methylpyridine and an inert diluent such as a perchlorinated hydrocarbon during a brief contact time at temperatures of from about 400° C. to about 490° C. and thereafter cooling to precipitate the desired starting material or fractionally distilling to recover the desired starting material.

We claim:
1. A (trichloromethyl)pyridine ether compound having the formula

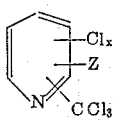

wherein Z is selected from the group consisting of OR and SR′; wherein in said OR, R is selected from the group consisting of (a) alkyl containing from 1 to 18 carbon atoms, inclusive, (b) aryl wherein said aryl is selected from the group consisting of phenyl and substituted phenyl containing from 1 to 5 substituents, inclusive, wherein the substituent is selected from the group consisting of alkyl containing from 1 to 10 carbon atoms, inclusive, phenyl, chloro and nitro and (c) lower alkenyl; wherein in said SR′, R′ is selected from the group consisting of (a) alkyl containing from 1 to 18 carbon atoms, inclusive, and (b) aryl, wherein said aryl is selected from the group consisting of phenyl and substituted phenyl containing from 1 to 5 substituents, inclusive, wherein the substituent is selected from the group consisting of alkyl containing from 1 to 4 carbon atoms, inclusive, phenyl, chloro and nitro; and wherein $x$ is an integer of from 1 to 3, inclusive.

2. 3,5 - dichloro - 4-(n-octylthio)-2-(trichloromethyl)-pyridine.
3. 3,5 - trichloro - 4 - methoxy-2-(trichloromethyl)pyridine.
4. 2,3,5 - trichloro-4-methoxy-2-(trichloromethyl)pyridine.
5. 2,3,5-trichloro 4 - ethoxy-2-(trichloromethyl)pyridine.
6. 2,3,5 - trichloro-4-isopropoxy-2-(trichloromethyl)-pyridine.
7. 3,5 - dichloro - 4-(p-chlorophenoxy)-2-(trichloromethyl)pyridine.
8. 3,5 - dichloro - 4-methylthio-2-(trichloromethyl)-pyridine.
9. 3,5 - dichloro - 4 - (n - propylthio)-2-(trichloromethyl)pyridine.
10. 3,5 - dichloro - 4 - isopropylthio-2-(trichloromethyl)pyridine.
11. 3,5 - dichloro - 4 - (n - decyloxy) -2-(trichloromethyl)pyridine.

References Cited by the Examiner
UNITED STATES PATENTS

| | | | |
|---|---|---|---|
| 2,679,453 | 5/1954 | Brett et al. | 260—290 |
| 3,135,594 | 6/1964 | Goring | 260—290 |
| 3,173,919 | 3/1965 | Johnston et al. | 260—290 |

WALTER A. MODANCE, *Primary Examiner.*